(12) United States Patent
Koh et al.

(10) Patent No.: US 11,144,939 B2
(45) Date of Patent: Oct. 12, 2021

(54) CROSS-DEVICE CONSUMER IDENTIFICATION AND DEVICE TYPE DETERMINATION

(71) Applicant: Adobe Inc., San Jose, CA (US)

(72) Inventors: Eunyee Koh, San Jose, CA (US); Nedim Lipka, Santa Clara, CA (US)

(73) Assignee: Adobe, Inc., San Jose, CA (US)

( * ) Notice: Subject to any disclaimer, the term of this patent is extended or adjusted under 35 U.S.C. 154(b) by 936 days.

(21) Appl. No.: 14/959,890

(22) Filed: Dec. 4, 2015

(65) Prior Publication Data

US 2017/0161761 A1 Jun. 8, 2017

(51) Int. Cl.
*G06Q 30/02* (2012.01)
*H04L 29/08* (2006.01)
*H04L 12/24* (2006.01)

(52) U.S. Cl.
CPC ....... *G06Q 30/0204* (2013.01); *H04L 41/145* (2013.01); *H04L 67/22* (2013.01)

(58) Field of Classification Search
None
See application file for complete search history.

(56) References Cited

U.S. PATENT DOCUMENTS

| | | | | |
|---|---|---|---|---|
| 9,516,053 | B1* | 12/2016 | Muddu | H04L 63/1433 |
| 2011/0208822 | A1* | 8/2011 | Rathod | G06F 16/9535 |
| | | | | 709/206 |
| 2015/0058393 | A1 | 2/2015 | Smith et al. | |
| 2015/0163121 | A1* | 6/2015 | Mahaffey | H04W 12/12 |
| | | | | 707/687 |
| 2017/0235786 | A9* | 8/2017 | Faith | G06Q 10/00 |
| | | | | 707/607 |

FOREIGN PATENT DOCUMENTS

JP 2009-512940 A * 3/2009 ............. H04L 67/22

OTHER PUBLICATIONS

Diego Duarte, Analyzing User Profiles in Electronic Markets, 2010 International Conference on Information Society (Year: 2010).*

(Continued)

*Primary Examiner* — Jerry O'Connor
*Assistant Examiner* — Matthew H Divelbiss
(74) *Attorney, Agent, or Firm* — Finch & Maloney PLLC

(57) ABSTRACT

An analytics server receives data characterizing consumer interactions that are observed by a cross-section of data providers, which may include, for example, website administrators, campaign managers, application developers, and the like. Such observational data includes device and login identifiers for a particular interaction, and optionally, timestamp information indicating when the interaction occurred. A statistical device graph model is generated based on this observational data. The statistical device graph model allows inferences to be drawn with respect to whether a given device is a private device, a shared device, or a public device. This, in turn, allows private devices which are "owned" by a single consumer to be identified. Depending on the type of observational data collected by the data providers, a wide range of additional insights can be drawn from the statistical device graph model, including for example, device usage patterns and confidence levels.

20 Claims, 8 Drawing Sheets

(56) References Cited

OTHER PUBLICATIONS

Dasgupta et al., "Overcoming Browser Cookie Churn with Clustering", Proceedings of the 5th ACM international conference on Web search and data mining, pp. 83-92 (2012).

Businesswire, "Netbiscuits Launches Visitor ID, Boosting Cross-Device Web Visitor Identification", <http://www.businesswire.com/news/home/20150908005710/en/Netbiscuits-Launches-Visitor-ID-Boosting-Cross-Device-Web> (Sep. 8, 2015).

Google Developers, "Cookies and User Identification", <https://developers.google.com/analytics/devguides/collection/analyticsjs/cookies-user-id?hl=en> (Sep. 30, 2015).

\* cited by examiner

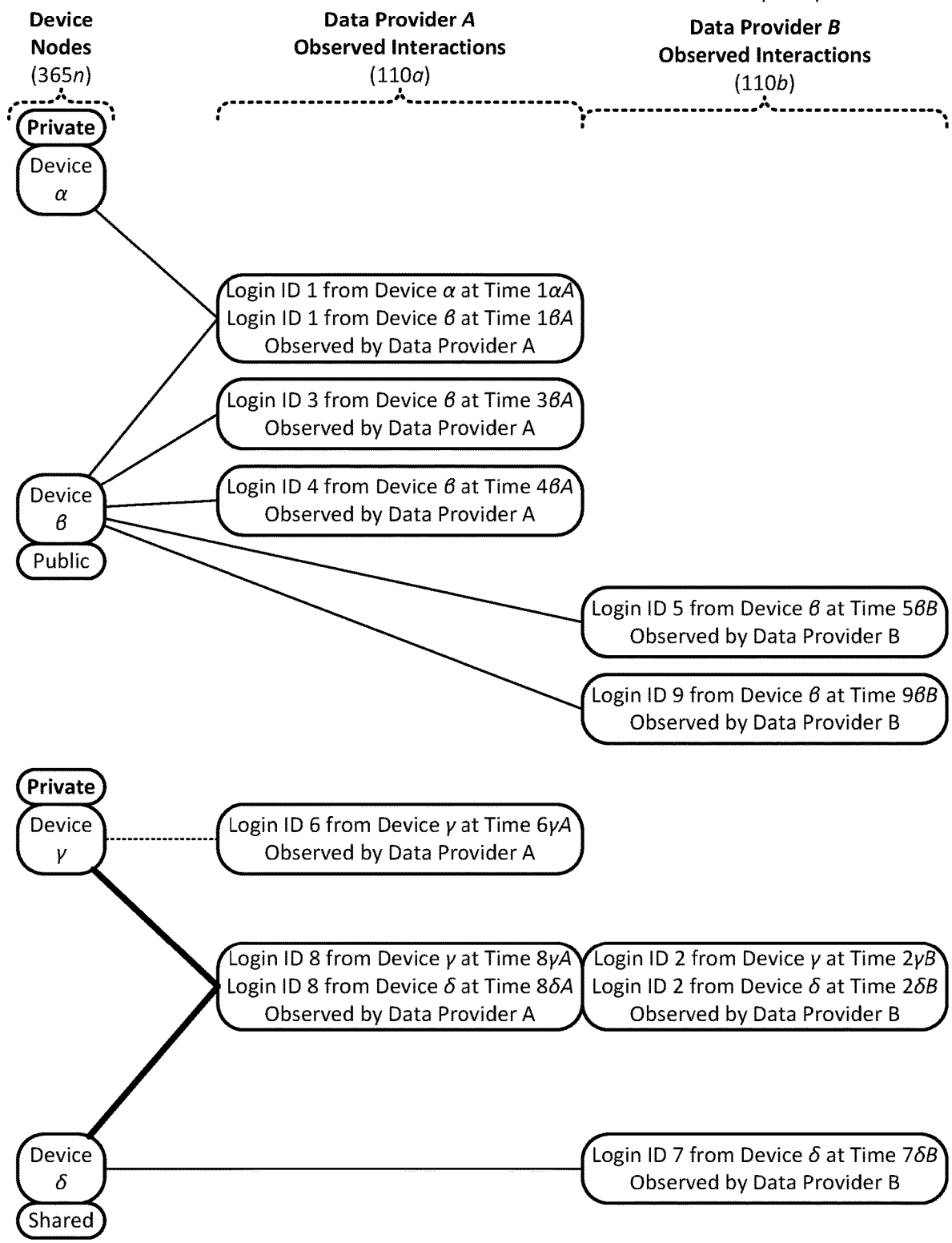

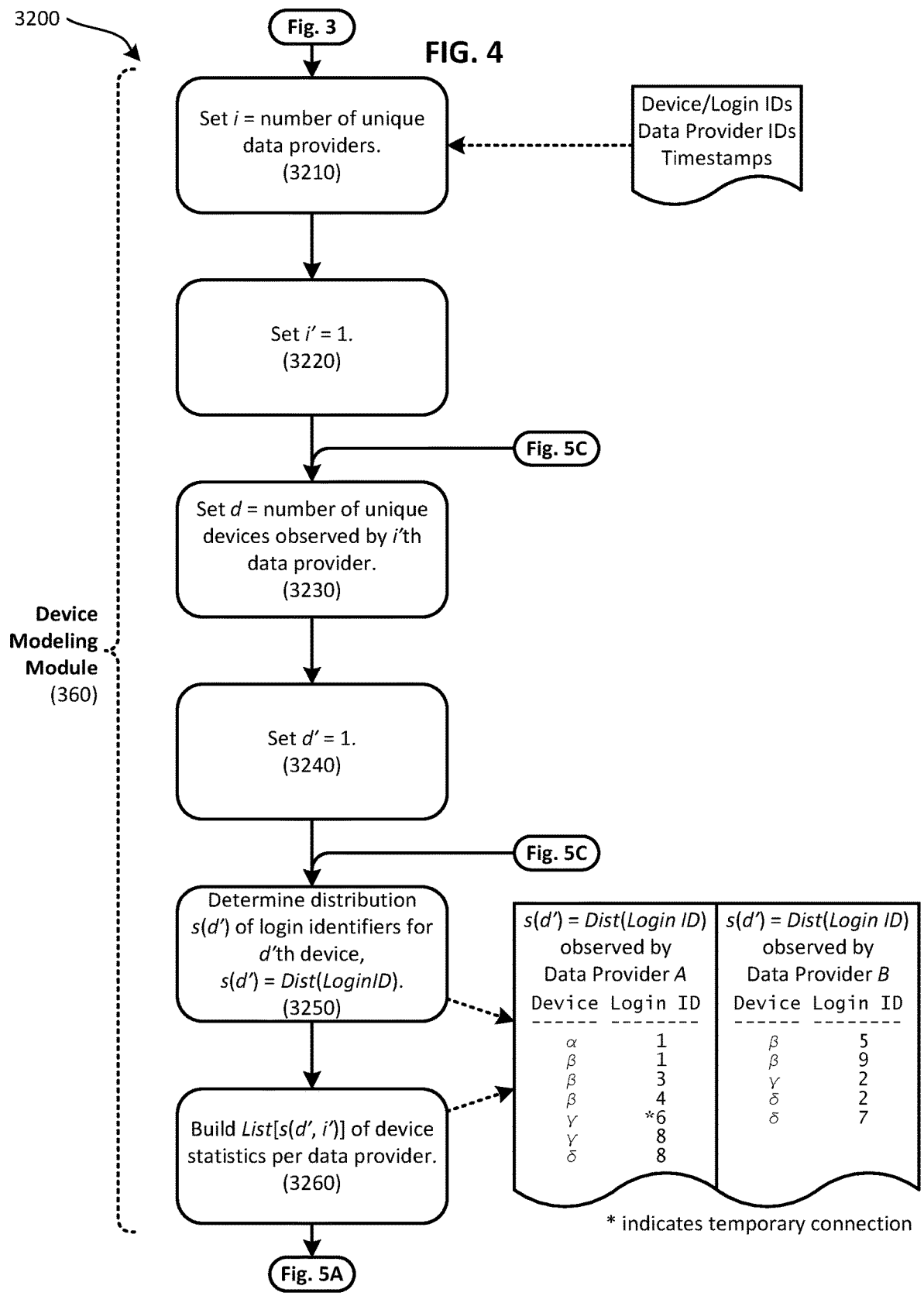

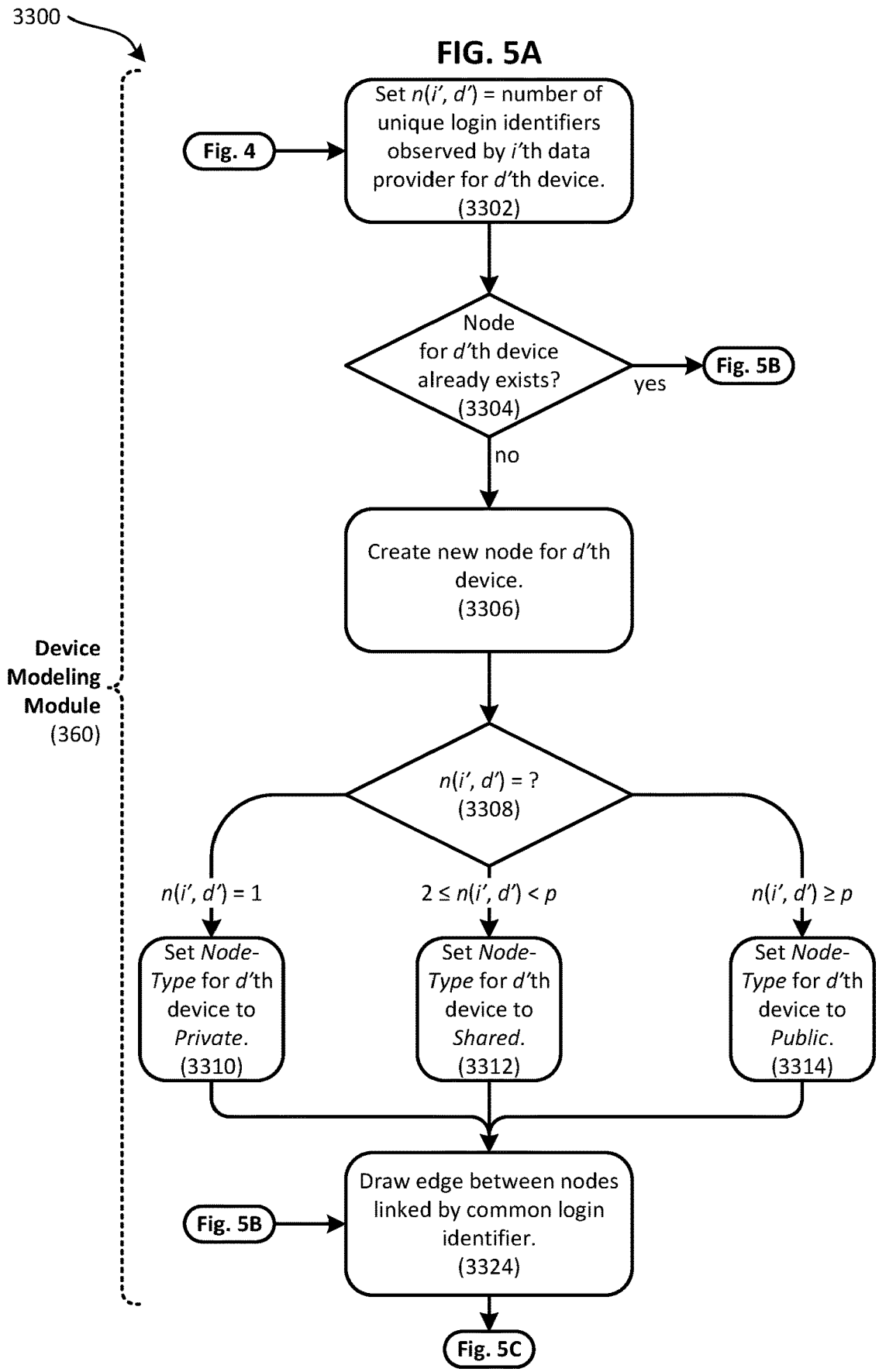

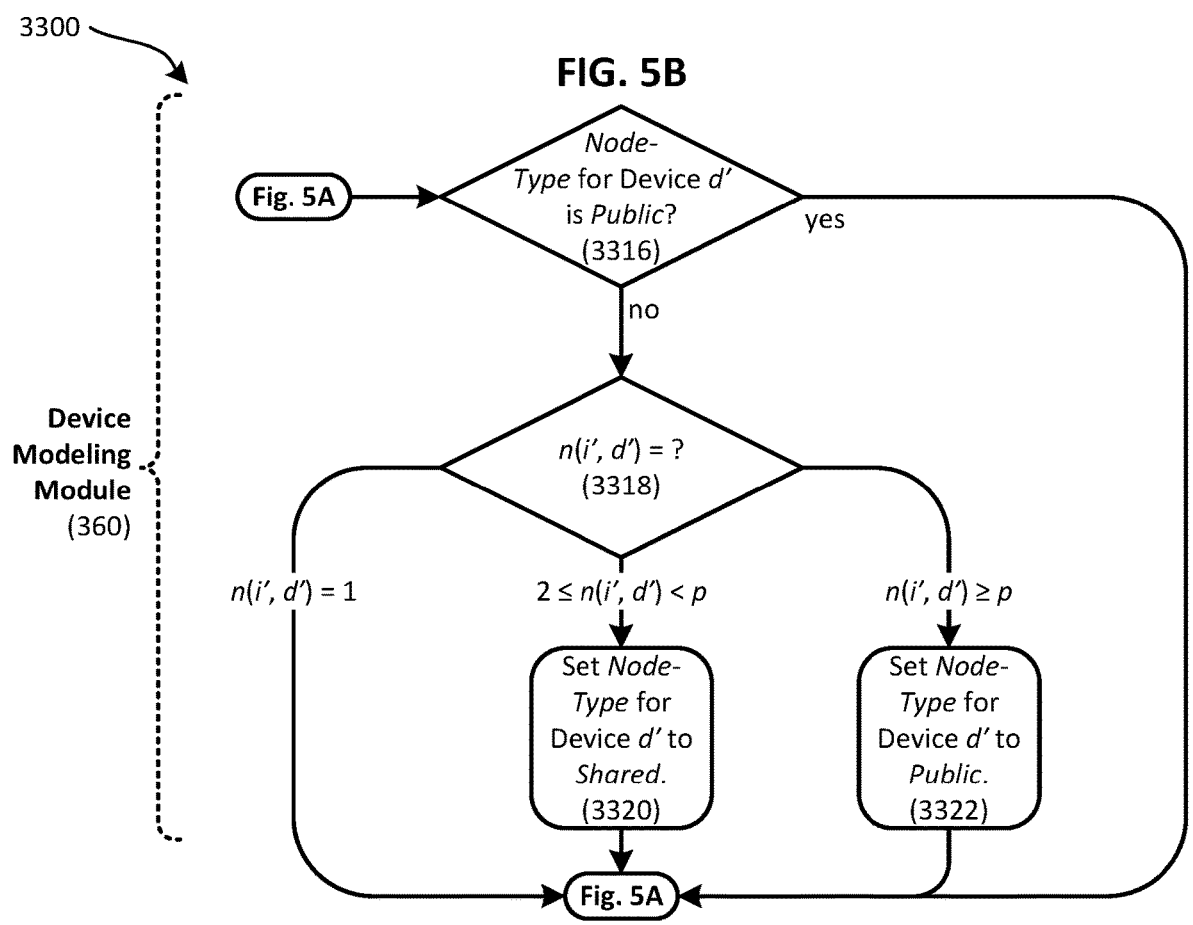

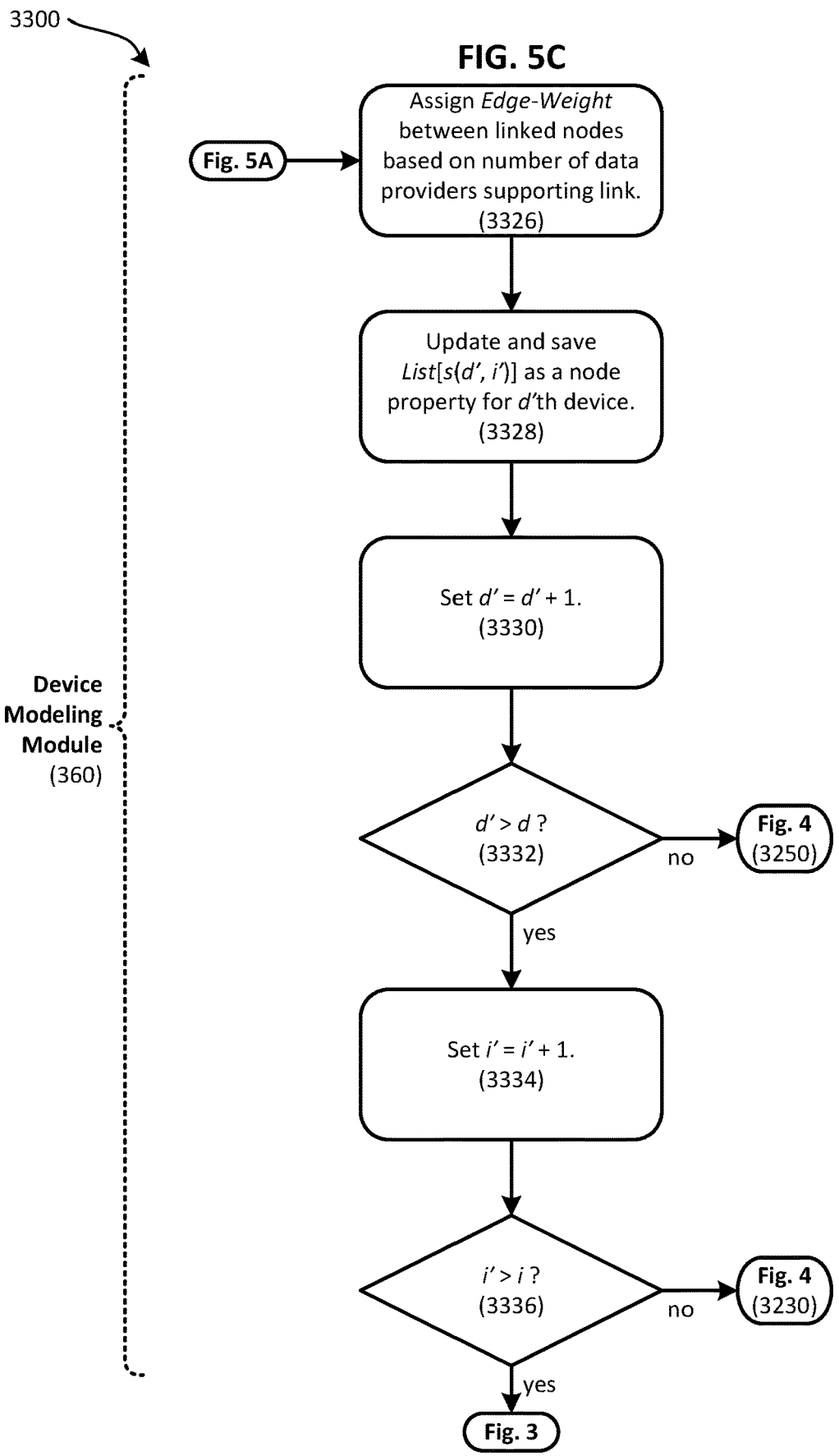

CROSS-DEVICE CONSUMER IDENTIFICATION AND DEVICE TYPE DETERMINATION

FIELD OF THE DISCLOSURE

This disclosure relates generally to analysis of how consumers interact with different computing devices to access online resources, and more specifically to methods for identifying the computing devices a particular consumer uses to access online resources.

BACKGROUND

As the number of people with access to the Internet continues to grow, online resources such as websites and software applications have become an increasingly important way for businesses, government agencies, and other entities to interact with the general public. For example, businesses routinely use websites to distribute information about products and services, conduct advertising and public relations campaigns, and transact business by receiving orders and payments. As a result, website administrators often devote substantial resources to analyzing the expectations of the consumers who visit the various webpages comprising a website. This is because website administrators who better understand what consumers expect from a website are better positioned to improve website efficacy in meeting those expectations. Likewise, an application developer who better understands what consumers expect from a mobile application is better positioned to tailor the application to fulfill consumer expectations. In either case, as it becomes increasingly common for consumers to use multiple and different types of devices to access online resources, an increasingly important aspect of understanding consumer behavior and meeting consumer expectations is understanding which devices a given consumer uses in the course of his/her online activities.

BRIEF DESCRIPTION OF THE DRAWINGS

FIG. 1B is an example statistical device graph model that represents observed interactions between data providers and consumers.

FIG. 4 is a flowchart illustrating an example method of building data structures that characterize observed interactions between data providers and consumers.

FIGS. 5A through 5C comprise a flowchart illustrating an example method of defining nodes that comprise a statistical device graph model that is generated based on observed interactions between data providers and consumers.

DETAILED DESCRIPTION

Figure 1A:
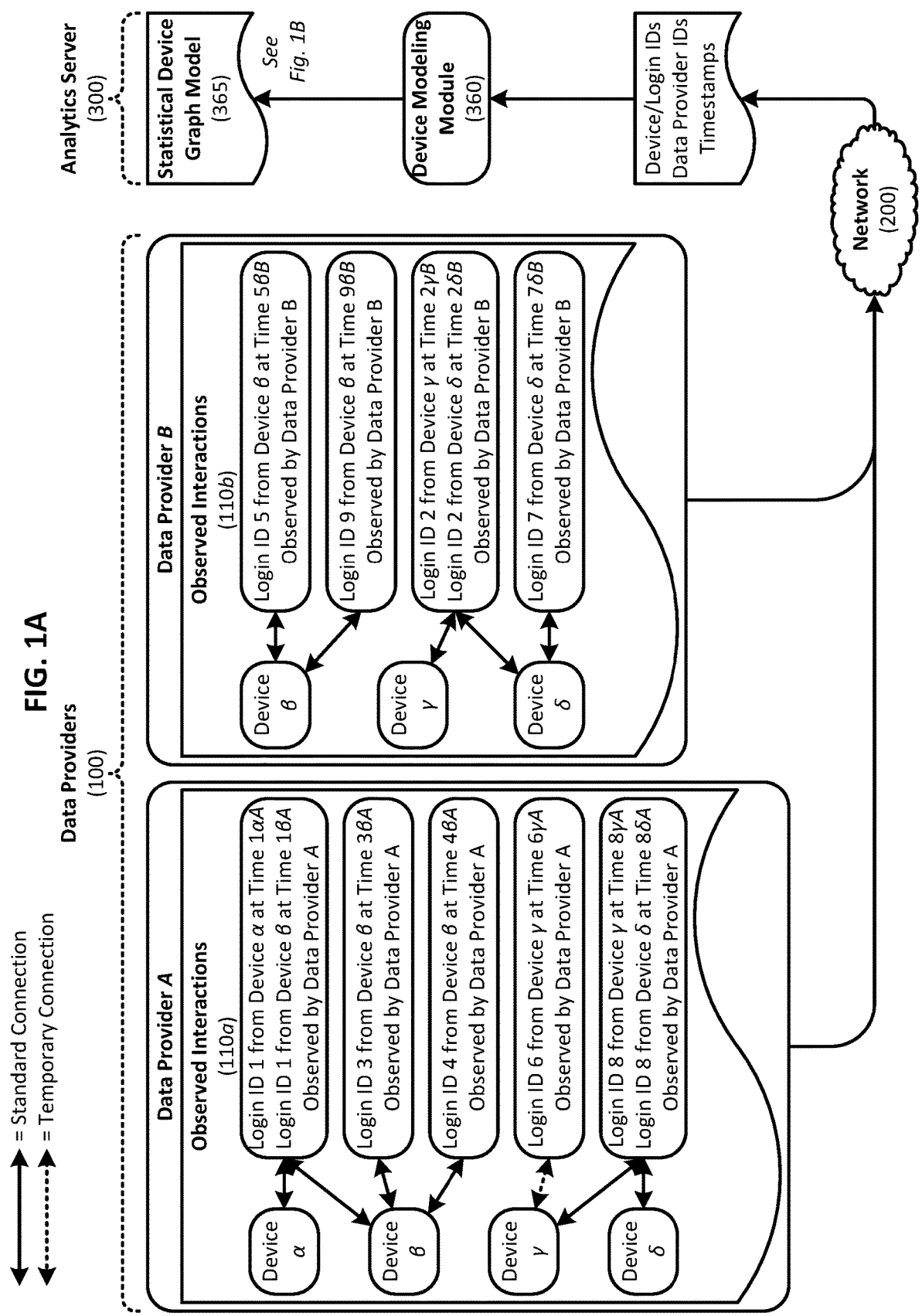
FIG. 1A is a block diagram schematically illustrating an example technique for generating a statistical device graph model based on observed interactions between data providers and consumers.

As noted above, consumers often use multiple devices to access online resources such as search engines, shopping portals, entertainment providers, social networks, and mobile software applications. The particular device a consumer uses to access a particular online resource may depend on, for example, when the resource is accessed, where the consumer is located when accessing the resource, and the type of resource that is accessed. For instance, a consumer may prefer using a tablet computer to watch television shows, but may find the conventional keyboard of a laptop computer preferable when shopping online. Regardless of what motivates a consumer to use a particular device to access a particular online resource, the fact the consumer uses multiple devices often makes it difficult to fully understand how the consumer interacts with different online resources. Another factor that adds to this difficulty is the increasing prevalence of public kiosks and the increasing tendency of consumers to share their devices with others, both of which provide an avenue whereby multiple consumers can share a single online access point. In particular, when multiple consumers share a single online access point it can be difficult to distinguish the activities of the consumers, thus making it difficult to understand how a particular consumer interacts with an online resource.

When a single consumer accesses an online resource using multiple devices, this will often frustrate efforts to understand the consumer's interactions with the online resource. For example, consider a consumer who clicks on a banner advertisement using a first device but later makes a purchase from a second device. This consumer will simultaneously appear both as an actively acquired consumer who failed to make a purchase, and as a passively acquired consumer who makes a purchase without seemingly having first viewed and selected any advertisement. An acquisition campaign associated with the advertisement will not be properly credited because the consumer's advertisement click cannot be linked to the subsequent purchase. In theory, such a link might exist if the consumer had identified himself/herself to both devices, for example by using both devices to log into the website where the purchase was consummated. However, as a practical matter consumers often do not login, or may prefer not to create a login account. These structural and behavioral factors represent substantial obstacles to website administrators, campaign managers, application developers, and others who seek to better understand how consumers interact with online resources, and in particular, how consumers use multiple devices in the course of their online activities.

Thus, in accordance with certain of the embodiments disclosed herein, improved analytical techniques provide reliable insights into the types of computing devices which are used to interact with online resources. These insights facilitate the process of linking multiple interactions with a single consumer, thus revealing how that consumer interacts with online resources. For example, in one embodiment an analytics server receives data characterizing consumer interactions that are observed by a cross-section of data providers, which may include, website administrators, campaign managers, application developers, and the like. Such observational data includes device and login identifiers for a particular interaction, and optionally, timestamp information indicating when the interaction occurred. A statistical device graph model is generated based on this observational data. The statistical device graph model allows inferences to be drawn with respect to whether a given device is a private device (that is, used exclusively or almost exclusively by a single consumer), a shared device (that is, used by a small number of different consumers), or a public device (that is, used by a large number of different consumers). This, in turn, allows private devices which are "owned" by a single consumer to be identified. Depending on the type of observational data collected by the data providers, a wide range of additional insights can be drawn from the statistical device graph model, including for example, device usage patterns and confidence levels. These and other advantages and alternative embodiments will be apparent in light of this disclosure.

General Overview and Definitions

In an example implementation observed interactions between consumers and data providers are analyzed to produce a statistical device graph model. The statistical device graph model provides insight into how particular devices are used, and allows certain devices to be associated with certain consumers. This technique is illustrated schematically in FIG. 1A, with a plurality of observed interactions 110a, 110b being processed by an analytics server 300 to generate a statistical device graph model 365. Such interactions occur when a consumer uses a particular device (for example, Device α) to provide a particular login identifier (for example, Login Identifier 1) to a particular data provider (for example, Data Provider A) at a particular time (for example, Time 1αA). The interactions can be observed, recorded, and reported by the data provider. As interactions such as these are observed by large population of data providers over time, the resulting observations are reported to and compiled by analytics server 300. Analytics server 300 uses the techniques disclosed herein to generate a statistical device graph model that represents the observed interactions. FIG. 1B illustrates an example statistical device graph model 365 that represents the particular interactions which are illustrated in FIG. 1A. Statistical device graph model 365, and the insights which it reveals, are thus derived from the observed interactions between consumers and data providers.

As illustrated in FIG. 1B, statistical device graph model 365 comprises a plurality of device nodes 365n, some of which are linked by observed interactions 110a, 110b. These links are represented by edges having an edge weight that corresponds to the relative confidence in the observed link, or in some cases, that represents a temporary connection. An edge will link two devices when a single data provider observes the two devices providing the same login identifier. Metadata characterizing device nodes 365n and the connecting edges can be recorded in a data structure that is stored in a memory device that forms part of analytics server 300.

A wide range of inferences and insights can be drawn from statistical device graph model 365. For example, Data Provider A was the only data provider to have observed an interaction with Device α, and Device α provided only a single login identifier (Login Identifier 1) to Data Provider A. Based on these observations, it can be inferred that Device α is a private device used by a single consumer. Statistical device graph model 365 also illustrates that Data Provider A and Data Provider B both observed interactions with Device β, and that Device β provided multiple login identifiers (Login Identifiers 1, 3, and 4 were provided to Data Provider A; Login Identifiers 5 and 9 were provided to Data Provider B). Based on these observations, it can be inferred that Device β is a public device used by multiple consumers. Furthermore, because Devices α and β were both observed as providing Login Identifier 1, it can be inferred that the consumer associated with Login Identifier 1 has access to both Devices α and β. An edge therefore connects nodes representing these two devices. Because this linkage between Devices α and β is based on observations provided by a single data provider (Data Provider A), this edge is assigned Edge-Weight$_{\alpha,\beta}$=1.

Statistical device graph model 365 also illustrates that Data Provider A observed both Device γ and Device δ provide Login Identifier 8, while Data Provider B observed both Device γ and Device δ provide Login Identifier 2. Based on these observations, it can be inferred that Login Identifier 8 and Login Identifier 2 are associated with a single user who uses different login identifiers at different data providers. Furthermore, because Devices γ and δ were both observed (by Data Provider A) as providing Login Identifier 8, it can be inferred that the consumer associated with Login Identifier 8 has access to both Devices γ and δ. This inference is corroborated by the fact that Devices γ and δ were both observed (by Data Provider B) as providing Login Identifier 2. An edge with Edge-Weight$_{\gamma,\delta}$=2 therefore connects nodes representing these two devices. The higher edge weight indicates a higher degree of confidence in the link between the two devices.

These are just a few examples of the wide range of inferences which can be drawn from statistical device graph model 365. A wide range of other inferences can be drawn depending on the particular data collected by data providers 100. For example, in implementations where data providers 100 collect timestamp data that characterizes the time at which interactions are observed, certain interactions may be characterized as representing a temporary connection between a device and a consumer. Or, by leveraging information regarding the types of online resources offered by a given data provider, inferences can be drawn with respect to how a particular consumer tends to use a particular one of his/her multiple private devices. For example, it may be observed that a particular consumer typically uses his/her tablet computer for watching television shows, but typically uses his/her laptop computer for online shopping. A wide range of other inferences and insights can be drawn from statistical device graph model 365, as will be described in turn.

The foregoing example implementation illustrates how a statistical device graph model can be used to help website administrators, campaign managers, application developers, and others overcome certain of the challenges presented by the growing tendency of consumers to use multiple and different types of devices in the course of their online activities. The statistical device graph model leverages consumer interaction data observed by a large number of diverse website administrators. Collecting observational data from a broad range of different online service providers, such as financial institutions, retail marketers, governmental agencies, and so forth, allows consumers to be observed in many different use contexts, and therefore allows the various devices used by those consumers to be characterized more accurately. As described above, observational data linking device and login identifiers can be leveraged to perform "cross-device visitor identification" in which interactions with multiple devices are deterministically stitched together as forming the interactions of a single consumer.

Certain of the embodiments disclosed herein avoid shortcomings associated with existing techniques for cross-device visitor identification. For example, techniques that rely on differentiating consumers based on login identifiers often produce inaccurate analytics because a single consumer may use different login identifiers when interacting with different online resources (that is, with different data providers). Even where consumers provide an identical login identifier to two different online resources, these values often cannot be matched because login identifiers are generally stored in hashed values. Existing cross-device visitor identification techniques also fail to adequately account for the fact that consumers often access online resources from a shared device, such as a public kiosk or a friend's smartphone.

As used herein, the term "data provider" refers, in addition to its ordinary meaning, to an entity that is capable of observing how a consumer interacts with an online resource, and that is further capable of reporting data that characterizes such interaction. One example of a data provider is a website administrator that is capable of receiving (that is, observing) a login identifier and a device identifier that are provided by or otherwise received from a website visitor. Another example of a data provider is a marketing campaign manager that has access to web traffic data that characterizes, for example, consumer interactions with a banner advertisement or other marketing asset. Yet another example of a data provider is an application developer that develops a mobile application that is capable of receiving (that is, observing) a login identifier and a device identifier that are provided by a consumer using a mobile device. Collectively, data providers can be understood as being associated with, and thus being able to observe, consumers in a wide range of market segments, and thus are capable of characterizing a diverse set of consumer interactions. In certain embodiments, a data provider provides the observational data to an analytics server that is capable of generating a statistical device graph model.

As used herein, the term "computing device" refers, in addition to its ordinary meaning, to an apparatus that has a processor, a memory, and input/output components that a consumer can use to access and/or interact with an online resource. A computing device will also typically include one or more software modules configured to implement certain functionality, as well as hardware capable of enabling such implementation. Examples of computing devices include handheld computers, cellular telephones, tablet computers, smartphones, laptop computers, desktop computers, and set-top boxes. Examples online resources which can be accessed using a computing device include websites, multimedia portals, social networks, and application programming interfaces. A computing device is also sometimes referred to as a "device" or a "machine".

As used herein, the term "login identifier" refers, in addition to its ordinary meaning, to information that is provided from a consumer to an online resource that is intended to identify the consumer to the online resource. Examples of login identifiers include a username and a digital certificate. In some cases more than one login identifier may be provided to an online resource as part of a user authentication framework. The online resource may store the login identifier as a hashed value. A login identifier does not necessarily uniquely identify a particular consumer, such as in the case where a first consumer uses a particular login identifier to identify himself/herself to a first online resource, and a second consumer uses that same login identifier to identify himself/herself to a second online resource. Likewise, a single consumer may use different login identifiers for authentication with different online resources. A login identifier may be transmitted either actively, for example by a user typing in a username, or passively, for example, as part of a single-sign-on process.

As used herein, the term "device identifier" refers, in addition to its ordinary meaning, to information that is provided to an online resource that is intended to identify a computing device to the online resource. One example of a device identifier is a cookie which is transmitted from a website visitor to a website server in response to the website visitor contacting the server. Other examples of device identifiers include a machine identification code and a mobile identifier. A device identifier does not necessarily uniquely identify a particular device, such as in the case where a manufacturer produces several devices having identical device identifiers. A device identifier may be transmitted either actively, for example by a user typing in his/her telephone number, or passively, for example, in response to execution of a script.

As used herein, the term "data structure" refers, in addition to its ordinary meaning, to a way of storing and organizing data in a computer accessible memory so that the data can be used by an application or software module. In its simplest from, a data structure can be, for example, a set of one or more memory locations. In some cases a data structure may be implemented as a so-called record, sometimes referred to as a struct or tuple, and may have any appropriate number of fields, elements, or storage locations. As will be further appreciated, a data structure may include data of interest or a pointer that refers to a memory location where the data of interest can be found. A data structure may have any appropriate format such as, for example, a lookup table or index format; an array format; a hash table format; a graph, tree, or hierarchal format having any number of nodes; an object format that includes data fields; or a combination of the foregoing. A data structure may include executable code for accessing and modifying the underlying structure and format of the data stored therein. In a more general sense, the data structure may be implemented as a data set that can store specific values without being constrained to any particular order or format. In one embodiment, a data structure comprises a list of device statistics organized by data provider, wherein the device statistics provide information that characterizes how a particular user has interacted with a particular device.

System Architecture

As described above, FIG. 1A is a block diagram schematically illustrating an example technique for generating statistical device graph model 365 based on observed interactions 110*a*, 110*b* that occur between data providers 100 and consumers (not shown). This example technique can be understood as involving a series of interactions that occur between data providers 100 and consumers, and that are reported to analytics server 300 via a network 200. While only two data providers are illustrated in FIG. 1A for purposes of clarity, it will be appreciated that other embodiments may include tens, hundreds, thousands, or indeed, any suitable number of data providers. The architecture and functionality of the various components and subcomponents comprising analytics server 300 will be described in turn. However, because the particular functionality provided by analytics server 300 in any given implementation may be specifically tailored to the demands of a particular application, this disclosure is not intended to be limited to provision or exclusion of any particular resources, components, or functionality.

Figure 2:
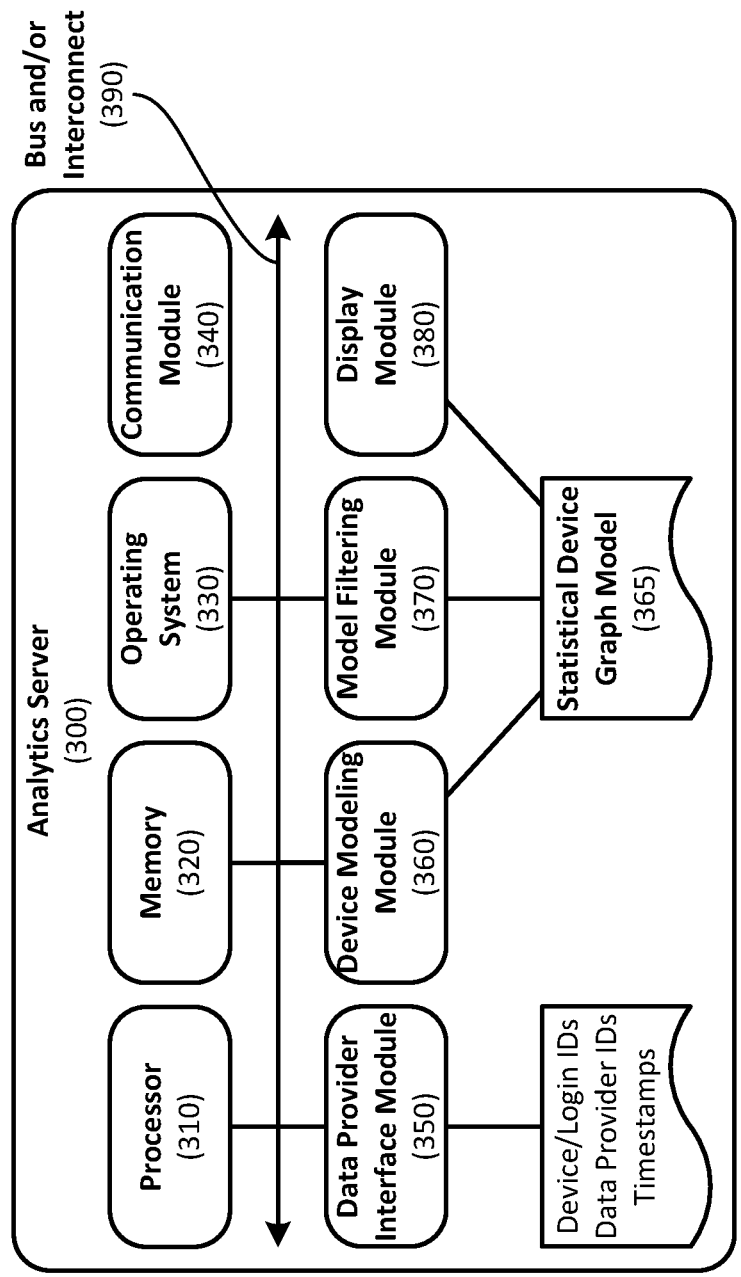
FIG. 2 is a block diagram schematically illustrating selected components of an example analytics server that includes a device modeling module that can be used to generate a statistical device graph model based on observed interactions between data providers and consumers.

FIG. 2 is a block diagram schematically illustrating selected components of an example implementation of analytics server 300. In one embodiment analytics server 300 comprises one or more enterprise class server devices that are configured to receive, from data providers 100, data that characterizes how consumers have interacted with data providers 100. Analytics server 300 includes one or more software modules configured to implement the various functionalities disclosed herein, as well as hardware that enables such implementation. Examples of enabling hardware include a processor 310, a memory 320, a communication module 340, and a bus and/or interconnect 390. Examples of implementing software include an operating system 330, a data provider interface module 350, a device modeling module 360, a model filtering module 370, and a display module 380. Analytics server 300 is coupled to network 200 to allow for communications with data providers 100, as well as with other networked computing devices and resources. In general, data providers 100 and analytics server 300 can be local to network 200 or remotely coupled to network 200 by one or more other networks or communication channels.

Processor 310 can be any suitable processor, and may include one or more coprocessors or controllers, such as a graphics processing unit, to assist in control and processing operations associated with analytics server 100. Memory 320 can be implemented using any suitable type of digital storage, such as one or more of a disk drive, a redundant array of independent disks (RAID), a universal serial bus (USB) drive, flash memory, random access memory, or any suitable combination of the foregoing. Thus in certain embodiments memory 320 comprises a distributed system of multiple digital storage devices, one or more of which may be remotely located and accessible via network 200. Memory 320 can be used to store data characterizing observed interactions 110a, 110b that are received from data providers 100, data structures which are produced in the course of generating statistical device graph model 365, and data structures which define statistical device graph model 365 itself.

Operating system 330 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with analytics server 300, and therefore may also be implemented using any suitable existing or subsequently developed platform. Communication module 340 can be any appropriate network chip or chipset which allows for wired and/or wireless connection to network 200 and other computing devices and resources. Communication module 340 can also be configured to provide intra-device communications via bus and/or interconnect 390.

Still referring to the example embodiment illustrated in FIG. 2, data provider interface module 350 comprises instructions encoded on a computer readable medium that, when executed using a processor, cause one or more of a variety of different data interfacing frameworks to be implemented. One such framework allows data characterizing observed interactions 110a, 110b to be received from data providers 100. The received observational data may comprise, for example, device identifiers, login identifiers, data provider identifiers, and timestamps. Additional, alternative, or fewer types of data may be received in other embodiments. In a modified embodiment, analytics server 300 is configured to coordinate a group of data providers 100 that have agreed to provide observational data in exchange for receiving analytics generated by analytics server 300. In such embodiments the data interfacing framework invoked by data provider interface module 350 optionally authenticates a data provider as being a member of the group before receiving the observational data. A membership arrangement such as this is not required, however, and thus in other embodiments data provider interface module 350 is configured simply to receive data sent by data providers 100.

Device modeling module 360 comprises instructions encoded on a computer readable medium that, when executed using a processor, cause one or more of a variety of different device modeling processes to be carried out. One such device modeling process involves generating statistical device graph model 365 based on observed interactions 110a, 110b between data providers 100 and consumers. This may be accomplished by generating data structures that characterize the observed interactions and defining graph nodes that represent the various observed devices. Where it can be inferred that two devices are used by a single consumer, the nodes representing those devices can be connected by a graph edge. The edge can be assigned a weight depending on whether the inference is supported by independent observations reported by multiple data providers 100. Based on the resulting statistical device graph model 365, the device modeling process is optionally configured to characterize the devices represented by the nodes in the graph, for example, by classifying such devices as private (that is, used exclusively or almost exclusively by a single consumer), shared (that is, used by a small number of different consumers), or public (that is, used by a large number of different consumers). These and other analytical techniques will be described in turn.

In implementations where a large quantity of observational data is gathered from data providers 100, it may be useful to selectively remove certain features from the resulting statistical device graph model 365. Model filtering module 370 comprises instructions encoded on a computer readable medium that, when executed using a processor, cause one or more of a variety of different model filtering and manipulation processes to be carried out. For example, one such model filtering process involves removing shared and public devices from statistical device graph model 365. This helps an analyst to focus on private devices, and in particular, facilitates the process of identifying a subset of private devices that are used by a single consumer. The model filtering and manipulation process may also be used to infer advanced graph properties based on supplemental observations, such as timestamp data. For example, in some cases analyzing timestamp data may allow an analyst to identify temporary connections, such as may occur when a private device is briefly used by someone other than the primary owner of the private device. Considering such data may lead to more accurate device classification. These and other model filtering and manipulation techniques may be implemented in alternative embodiments.

Display module 380 comprises instructions encoded on a computer readable medium that, when executed using a processor, cause one or more of a variety of different display processes to be carried out. For example, in some cases analytics server 300 is associated with a peripheral or integrated display device that allows statistical device graph model 365 to be displayed directly using analytics server 300. Such an implementation may be useful for an analyst working independently of any particular data provider. On the other hand, in an alternative embodiment the display processes invoked by display module 380 are configured to send a representation of statistical device graph model 365 to one or more data providers 100 or to a third party. The representation is optionally interactive, so as to facilitate the process of extracting insights from the model or invoking filtering operations. Sending statistical device graph model 365 to another entity may be useful where the recipient data provider or third party wishes to conduct its own analytics. In some cases display module 380 also coordinates rendering processes that allow statistical device graph model 365 to be printed or transmitted via network 200, for example via an electronic mail message or a web interface.

The embodiments disclosed herein can be implemented in various forms of hardware, software, firmware, and/or special purpose processors. For example, in one embodiment a non-transitory computer readable medium has instructions encoded thereon that, when executed by one or more processors, implement one or more of the methods disclosed herein for identifying the computing devices a particular consumer uses to access online resources. The instructions can be encoded using any suitable programming language, such as Scala, C, C++, object-oriented C, Swift, JavaScript, Java, Visual Basic .NET, BASIC, or alternatively, using custom or proprietary instruction sets. Such instructions can be provided in the form of one or more computer software applications and/or applets that are tangibly embodied on a memory device, and that can be executed by a computer having any suitable architecture. In one embodiment the system can be hosted on a given website and implemented, for example, using JavaScript or another suitable browser-based technology.

The functionalities disclosed herein can be incorporated into a wide range of software applications, such as a web traffic analysis application, a campaign management application, or a market analysis and segmentation application. For example, in one implementation analytics server 300 provides data providers 100 with insights into how individual consumers interact with the various computing devices that are available to them in exchange for the observational data collected by data providers 100. In general, an individual data provider will be unable to accurately and reliably generate such insights based only on the observational data available to that single data provider. The computer software applications disclosed herein may include a number of different modules, sub-modules, or other components of distinct functionality, and can provide information to, or receive information from, still other components and services. These modules can be used, for example, to communicate with peripheral hardware components, integrated hardware components, networked storage resources, or other external components and/or resources, such as data providers 100. More generally, other components and functionality not reflected in the illustrations will be apparent in light of this disclosure, and it will be appreciated that the present disclosure is not intended to be limited to any particular hardware or software configuration. Thus in other embodiments the components illustrated in FIG. 2 may comprise additional, fewer, or alternative sub-components.

The aforementioned non-transitory computer readable medium may be any suitable medium for storing digital information, such as a hard drive, a server, a flash memory, and/or random access memory (RAM). In alternative embodiments, the computers and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used in this regard, and that the present disclosure is not intended to be limited to any particular system architecture.

Methodology

Figure 3:
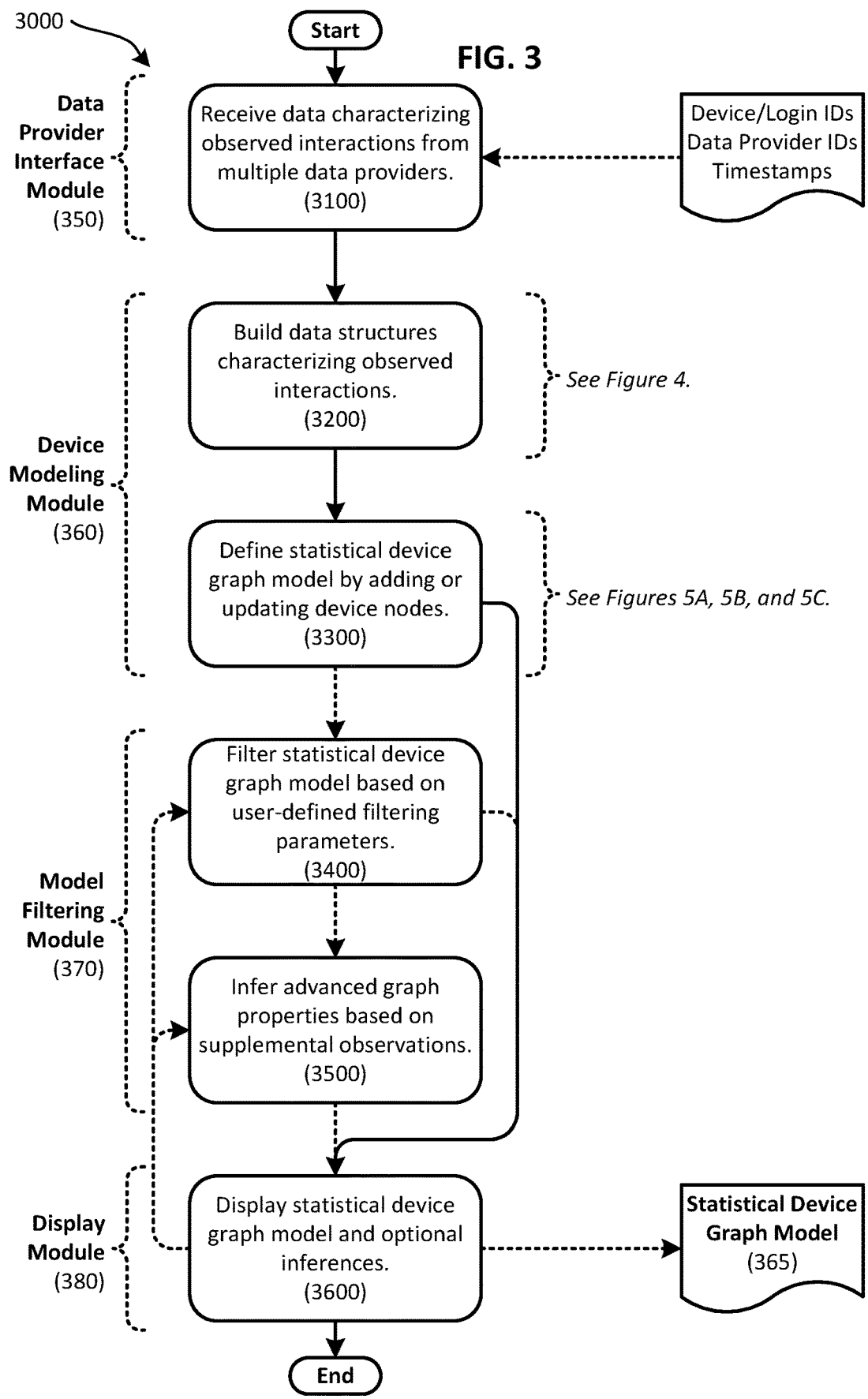
FIG. 3 is a flowchart illustrating an example method of generating a statistical device graph model based on observed interactions between data providers and consumers.

FIG. 3 is a flowchart illustrating an example method 3000 of generating statistical device graph model 365 based on observed interactions between data providers 100 and consumers. As can be seen, method 3000 includes a number of phases and sub-processes, the sequence of which may vary from one embodiment to another. However, when considered in the aggregate, these phases and sub-processes form part of an improved behavioral analysis framework that is capable of identifying the computing devices a particular consumer uses to access online resources. In one implementation, this analytical framework is responsive to user input in accordance with certain of the embodiments disclosed herein. In alternative implementations, the analysis disclosed herein is performed automatically, for example in response to receiving observational data from data providers 100. Method 3000 can be implemented, for example, using the system architecture illustrated in FIG. 2 and described herein. However other system architectures can be used in other embodiments, as will be apparent in light of this disclosure. To this end, the correlation of the variations functionalities shown in FIG. 3 to the specific components illustrated in FIG. 2 is not intended to imply any structural and/or use limitations. Rather other embodiments may include, for example, varying degrees of integration wherein multiple functionalities are effectively performed by one system or module. For example, in an alternative embodiment a single user interface module can be used to receive observational data from data providers 100 and display statistical device graph model 365. Thus other embodiments may have fewer or more modules depending on the granularity of implementation. Numerous variations and alternative configurations will be apparent in light of this disclosure.

As illustrated in FIG. 3, method 3000 commences with using a data interfacing framework invoked by data provider interface module 350 to receive data characterizing observed interactions from multiple data providers 100. See reference numeral 3100 in FIG. 3. As illustrated, the received data may include, for example, device identifiers, login identifiers, data provider identifiers, and optionally, timestamp data. Additional, alternative, or fewer types of data may be received in other embodiments. As illustrated in FIG. 1A, the received observational data can be used to characterize an interaction between a consumer and a data provider that is reporting the interaction. Once received, such data can be used by device modeling module 360 to build one or more data structures that characterize the observed interactions. See reference numeral 3200 in FIG. 3.

FIG. 4 is a flowchart illustrating an example method 3200 of building data structures that characterize observed interactions between a plurality of data providers 100 and consumers. In this context, the quantity i can be defined as the number of unique data providers from which observational data is received. See reference numeral 3210 in FIG. 4. To facilitate sequential analysis of the data received from the i unique data providers, device modeling module 360 compares the quantity i to a data provider counting parameter i' which is initially set such that i'=1. See reference numeral 3220 in FIG. 4. Likewise, the quantity d can be defined as the number of unique devices observed by the i'th data provider. See reference numeral 3230 in FIG. 4. To facilitate sequential analysis of the d devices observed by the i'th data provider, device modeling module 360 compares the quantity d to a device counting parameter d' which is initially set such that d'=1. See reference numeral 3240 in FIG. 4.

The device modeling process invoked by device modeling module 360 is configured to determine a distribution of login identifiers observed as having been provided by the d'th device, s(d')=Dist(LoginID). See reference numeral 3250 in FIG. 4. As illustrated, this allows a data structure to be generated corresponding to the distribution s(d'). The device modeling process invoked by device modeling module 360 is also configured to build a list of device statistics, List[s(d', i')], for the d'th device, as observed by the i'th data provider. See reference numeral 3260 in FIG. 4. These statistics can be stored in the same data structure that is used to store the distribution of login identifiers s(d'). Examples of device statistics that can be included in List[s(d', i')] include, for example, browser history associated with the d'th device, frequency at which the d'th device is observed as providing a particular login identifier, how many login identifiers access a specified browser cookie stored on the d'th device, how often the i'th data provider reports observational data, and the like. In general, List[s(d', i')] can be understood as including device statistics that provide additional insight into how a particular device is used. For instance, browser history analysis may reveal that a particular consumer uses both a smartphone and a laptop computer for online shopping, but tends to only make purchases using the laptop computer. In some cases the statistics included in List[s(d', i')] are defined by a particular data provider, and in particular, may include custom or proprietary statistics collected by that data provider.

Once appropriate data structures characterizing the observed interactions have been built, such data can be used to define device nodes 365$n$ that comprise statistical device graph model 365. See reference numeral 3300 in FIG. 3. As illustrated in FIG. 1B, statistical device graph model 365 comprises a plurality of device nodes 365$n$, some of which are linked by observed interactions 110a, 110b. To this end, FIGS. 5A through 5C comprise a flowchart illustrating an example method 3300 of defining nodes 365$n$ that comprise statistical device graph model 365. Method 3300 commences with the device modeling process invoked by device modeling module 360 setting the parameter n(i', d') equal to the number of unique login identifiers observed by the i'th data provider as having been provided by the d'th device. See reference numeral 3302 in FIG. 5A. For instance, referring to the example observational data illustrated in FIG. 1A, Data Provider A observed one unique login identifier (Login Identifier 1) has having been provided by Device α. That is, n(A, α)=1. As another example, Data Provider B observed two unique login identifiers (Login Identifier 5 and Login Identifier 9) as having been provided by Device β. That is, n(B, β)=2. Data representing the values n(i', d') for all data providers and devices is optionally stored in a data structure maintained by analytics server 300.

Once n(i', d') has been determined for the i'th data provider and the d'th device, it is determined whether statistical device graph model 365 already includes a node for the d'th device. See reference numeral 3304 in FIG. 5A. If not, a new node for the d'th device is created. See reference numeral 3306 in FIG. 5A. The value n(i', d') can be used to assign a Node-Type parameter for the d'th device. See reference numeral 3308 in FIG. 5A. For example, in one implementation if n(i', d')=1, the Node-Type for the d'th device can be set to Private. See reference numeral 3310 in FIG. 5A. This indicates that the d'th device appears to be used exclusively or nearly exclusively by a single user. In another implementation, if $2 \leq n(i', d') < p$, the Node-Type for the d'th device can be set to Shared. See reference numeral 3312 in FIG. 5A. This indicates that the d'th device appears to be used exclusively by a relatively small group of users, such as a family having fewer than p members. In yet another implementation, if $n(i', d') \geq p$, the Node-Type for the d'th device can be set to Public. See reference numeral 3314 in FIG. 5A. This indicates that the d'th device appears to be a public device used by a several (for example, p or more) different users. The parameter p can be understood as a public use cutoff parameter, wherein use by p or more different users is taken to be indicative of a publicly used device. In one implementation p=6, while in other embodiments, p=3, 4, 5, 7, 8, 9, or 10. Other values of p can be used in other embodiments. Data representing the Node-Type for nodes 365$n$ comprising statistical device graph model 365 is optionally stored in a data structure maintained by analytics server 300.

If statistical device graph model 365 already includes a node for the d'th device, it is determined whether the Node-Type for this existing node is Public. See reference numeral 3316 in FIG. 5B. If so, the Node-Type is not modified based on observations by the i'th data provider since the previously observed public use will supersede any subsequently observed private or shared use. On the other hand, if the Node-Type for the existing node is Private or Shared, the value n(i', d') can be used to reevaluate update this Node-Type. See reference numeral 3318 in FIG. 5B. For example, in one implementation if n(i', d')=1, the Node-Type for the d'th device is not modified based on observations by the i'th data provider since the subsequently observed private use will not alter an earlier characterization of the d'th device as being a Private or Shared device. In another implementation, if $2 \leq n(i', d') < p$, the Node-Type for the d'th device can be set to Shared. See reference numeral 3320 in FIG. 5B. This is because the subsequently observed shared use will supersede any previously observed private use. In yet another implementation, if $n(i', d') \geq p$, the Node-Type for the d'th device can be set to Public. See reference numeral 3322 in FIG. 5B. This is because the subsequently observed public use will supersede any previously observed private or shared use.

The foregoing framework for setting a Node-Type for nodes 365$n$ comprising statistical device graph model 365 designates as Private those devices that provide a single login identifier, as reported by a single data provider. See, for example, Device a in FIG. 1B. Temporary connections are optionally ignored. Temporary connections can be identified by timestamp data and login frequency, thus providing an indication of how often a given data provider observes a particular device providing a particular login identifier. In this context, connection frequency can be evaluated with respect to timeframe. In particular, connection frequency can be compared to a baseline or expected connection frequency, and if the connection frequency is much less than would otherwise be expected, this can be indicative of a temporary connection. Likewise, recency of connection can be evaluated as well, and if a connection has not been observed for a relatively long time, this can be taken as yet another indication of a temporary connection.

In some cases a private device used by a single consumer may provide multiple different login identifiers, but each of the different login identifiers is reported by a different data provider. See, for example, Private Device γ in FIG. 1B, which Data Provider A observed as providing only Login Identifier 8, and which Data Provider B observed as providing only Login Identifier 2. This device classification framework thus recognizes that a single consumer may use different login identifiers when interacting with different data providers. Based on observed timestamp data and login frequency data, the temporary connection associated with Login Identifier 6 is ignored. As indicated in FIGS. 5A, 5B, and 5C, Shared devices provide more than one, but still a relatively small number (<p) of login identifiers to a single data provider, optionally depending on the login frequencies (to identify and eliminate temporary connections) and the period of time over which a given data provider collects observational data. Public devices provide a relatively large number (≥p) of login identifiers to a single data provider.

In some cases, the particular quantities of observed login identifiers corresponding to different Node-Type parameters may be defined differently for different data providers, for example depending on how a particular data provider typically interacts with consumers. For example, if a social networking data provider observes that a particular device provides a single login identifier with a small number of exceptions where an alternative login identifier was provided, the exceptions may be considered outliers corresponding to temporary connections, and the Device-Type may still be set to Private. Given that consumers often access social networking services several times a day, relatively little significance may attach to a single observation of an otherwise private device being shared. However, if a tax preparation data provider makes the same observation, this may be sufficient to set the Device-Type to Shared since tax preparation services are typically not accessed as frequently as social networking services, and since consumers may be less likely to share their device to access to tax preparation services as compared to social networking services. Thus the observational data may be interpreted and responded to differently depending on the nature of the data provider reporting the observational data.

Classifying device usage patterns based observational data reported from several different data providers results in more accurate device classification. For example, if a particular device appears to be a private device based on observations made by a first data provider, but appears to be a shared device based on observations made by a second data provider, the device can be more accurately classified as a shared device since the private use observed by the first data provider cannot supersede the shared use observed by the second data provider. The device classification framework disclosed herein and illustrated in FIGS. 5A, 5B, and 5C therefore classifies a particular device based on a maximum quantity of observed login identifiers as recorded in the distribution s(d')=Dist(LoginID).

Once the Node-Type has been set for the d'th device, an edge can be drawn between nodes which are linked by a common login identifier. See reference numeral 3324 in FIG. 5A. For example, as illustrated in FIG. 1B, Device α and Device β were both observed to have provided Login Identifier 1 (to Data Provider A), and therefore the nodes associated with these two devices are linked by an edge. Likewise, Device γ and Device δ were both observed to have provided Login Identifiers 8 and 2 (to Data Providers A and B, respectively), and therefore the nodes associated with these two devices are also linked by an edge. An Edge-Weight between linked nodes can be assigned based on the number of data providers supporting that link. See reference numeral 3326 in FIG. 5C. For example, referring again to FIG. 1B, the link between Device α and Device β was observed by one data provider (Data Provider A), and thus the edge representing this link is assigned Edge-Weight$_{\alpha\beta}$=1. On the other hand, the link between Device γ and Device δ was observed by two data providers (Data Provider A and Data Provider B), and thus the edge representing this link is assigned Edge-Weight$_{\gamma\delta}$=2. The edge weight is therefore representative of the relative confidence in the observed link.

The Node-Type parameter and, depending on the observations, an edge having an Edge-Weight, are associated with the node corresponding to the d'th device. The list of device statistics, List[s(d', i')] is also optionally associated with the node corresponding to the d'th device. See reference numeral 3328 in FIG. 5C. This allows additional filtering operations to be applied to statistical device graph model 365, and in turn, allows additional inferences to be drawn with respect to how particular users interact with particular devices.

Once operations associated with the d'th device have been completed, the device counting parameter d' is incremented. See reference numeral 3330 in FIG. 5C. The incremented device counting parameter d' is then compared to the total number of devices d observed by the i'th data provider. See reference numeral 3332 in FIG. 5C. If d'≤d, then the i'th data provider observed interactions with additional devices which should be processed by device modeling module 360, as described herein. See reference numeral 3250 in FIG. 4. However, if d'>d, then all interactions observed by the i'th data provider have been processed. In this case, the data provider counting parameter i' is incremented. See reference numeral 3334 in FIG. 5C. The incremented data provider counting parameter i' is then compared to the total number of data providers i reporting observational data to analytics server 300. See reference numeral 3336 in FIG. 5C. If i'≤i, then additional data providers reported data to analytics server 300 which should be processed by device modeling module 360, as described herein. See reference numeral 3230 in FIG. 4. Otherwise, if i'>i, then all observational data reported to analytics server 300 has been processed.

Referring again to FIG. 3, once all observational data that has been reported to analytics server 300 has been processed, statistical device graph model 365 can be understood to be complete. Optionally, display module 380 can be used to display statistical device graph model 365. See reference numeral 3600 in FIG. 3. However, in some cases additional analytical operations can be performed before and/or after statistical device graph model 365 is displayed. In some cases statistical device graph model 365 is optionally filtered based on user-defined filtering parameters. See reference numeral 3400 in FIG. 3. This may be particularly useful in implementations where a large quantity of observational data is gathered from a correspondingly large number of data providers 100. For example, in one implementation a model filtering process invoked by model filtering module 370 allows nodes representing shared and public devices to be temporary or permanently removed from statistical device graph model 365, thus helping an analyst to focus on private devices, and in particular, to identify a subset of private devices that are used by a single consumer. In an alternative embodiment, if the analyst wishes to achieve a household level of cross-device identification, statistical device graph model 365 can be filtered to remove only public devices. In some applications, the analyst may wish to filter statistical device graph model 365 based on temporal considerations, for example so as to remove temporary connections based only on a relatively small number of observations clustered in a relatively short time period.

Another example of an additional analytical operation that can be performed on statistical device graph model 365 is inferring advanced graph properties based on supplemental observations. See reference numeral 3500 in FIG. 3. For example, in one implementation the observational data can be analyzed to determine which device a particular consumer uses most frequently, uses to consummate purchases, or uses to perform any other activity of interest. Such inferences can be drawn based on supplemental observations which are reported by one or more data providers 100, and which can be recorded in the aforementioned list of device statistics List[s(d', i')]. These supplemental observations may be extracted from a device's browser history, from timestamp data compiled by a data provider, or from any other known or subsequently developed metrics, some of which may be customized by, or proprietary to, a particular data provider. In some cases supplemental information, such as login frequencies, data provider reliability scores, data provider recency scores, and the like, can be displayed in statistical device graph model 365. Data provider recency scores can be normalized based on a data provider's baseline login frequency, which would be different, for example, for a social networking service (where consumers often interact several times per day) than for a tax preparation data provider (where consumers may interact only several items per year).

Method 3000 can be used to determine and report a wide range of information about the devices observed by data providers 100. For example, by filtering statistical device graph model 365 to show only private devices, a "private device graph" can be produced. The private device graph can be used to perform cross-device visitor identification wherein interactions with multiple devices are deterministically stitched together as forming the interactions of a single consumer. The private device graph can also be used to detect when a particular one of a user's multiple devices is used primarily for certain tasks, such as a tablet computer that is often used to watch television shows, or a laptop computer that is often used to make online purchases. If statistical device graph model 365 is filtered to include shared devices, optionally exclusively, the properties of the shared devices can be analyzed to determine how such devices are shared, such as by family members, or by members of a common market segment. For example, a particular device may be appear to be a shared device based on observations made by online shopping data providers, but may appear to be a private device based on observations made by social networking data providers. Shared devices are optionally associated with a most dominant consumer. In some cases statistical device graph model 365 may be filtered to include public devices, optionally exclusively, and inferences may be drawn with respect to how certain public devices are typically used. These represent just a few examples of the wide range of information that can be extracted from statistical device graph model 365 using the filtering and inferences tools provided by model filtering module 370.

Further Example Embodiments

Numerous variations and configurations will be apparent in light of this disclosure. For instance, one example embodiment provides a computer-implemented cross-device consumer identification method. The method includes receiving observational data from a plurality of data providers. The observational data characterizes a plurality of consumer interactions with the data providers. Each of the consumer interactions is characterized by a device identifier and a login identifier. The device identifier is associated with a device that is used to provide the login identifier to one of the data providers. The method further includes defining a plurality of nodes, each of which corresponds to a device that is associated with one or more of the plurality of consumer interactions characterized by the observational data. The method further includes setting a Device-Type parameter for a particular one of the plurality of nodes. The Device-Type parameter characterizes the device corresponding to the particular node as Private, Shared, or Public. The Device-Type parameter is set based on consumer interactions with more than one of the plurality of data providers from which the observational data is received. The method further includes establishing a link between at least two of the plurality of nodes. The at least two linked nodes correspond to at least two devices that were observed to have provided a login identifier that is common to a single data provider. The method further includes recording, in a data structure stored in a memory device, metadata characterizing the plurality of nodes and the established link. In some cases the computer-implemented cross-device consumer identification method further includes (a) determining a first quantity of unique login identifiers observed by a first data provider as having been provided by the device; and (b) determining a second quantity of unique login identifiers observed by a second data provider as having been provided by the device, wherein the Device-Type parameter is initially set based on the first quantity, and is reevaluated based on the second quantity. In some cases the link is associated with an edge weight that corresponds to a quantity of data providers that observed the at least two devices providing the login identifier that is common to the single data provider. In some cases the computer-implemented cross-device consumer identification method further includes displaying a statistical device graph model including the plurality of nodes and an edge connecting the at least two nodes corresponding to the at least two devices that were observed to have provided the common login identifier to the single data provider. In some cases the computer-implemented cross-device consumer identification method further includes determining a distribution of login identifiers observed as having been provided by a particular device. In some cases the device identifier includes cookie data transmitted from the device to one of the data providers.

Another example embodiment provides a non-transitory computer readable medium encoded with instructions that, when executed by one or more processors, cause a device type determination process to be carried out. The process includes receiving observational data from a plurality of data providers. The observational data characterizes a plurality of consumer interactions with the data providers. Each of the consumer interactions is characterized by a device identifier and a login identifier, the device identifier being associated with a device that is used to provide the login identifier to one of the data providers. The observational data includes a plurality of device identifiers that are associated with a corresponding plurality of devices. The process further includes determining a first quantity of unique login identifiers observed by a first data provider as having been provided by a particular one of the plurality of devices. The first data provider is one of the plurality of data providers from which observational data is received. The process further includes setting a Device-Type parameter for the particular device based on the first quantity. The process further includes determining a second quantity of unique login identifiers observed by a second data provider as having been provided by the particular device. The second data provider is one of the plurality of data providers from which observational data is received. The process further includes reevaluating the Device-Type parameter based on the second quantity. In some cases Device-Type parameter is selected from a group consisting of Private, Shared, and Public. In some cases (a) the observational data further includes timestamp data associated with certain of the consumer interactions; and (b) determining the first quantity of unique login identifiers includes evaluating consumer interactions that occurred within a defined timeframe. In some cases setting the Device-Type parameter includes setting the Device-Type parameter to Private when the first quantity is one. In some cases reevaluating the Device-Type parameter includes changing the Device-Type parameter from Private to Shared or Public when the first quantity is one and the second quantity is greater than one. In some cases the device type determination process further includes (a) defining a node that corresponds to the particular device; (b) adding the node to a statistical device graph model that includes a plurality of additional nodes, each of which corresponds to one of the plurality of devices; and (c) displaying the statistical device graph model. In some cases the device type determination process further includes (a) defining a node that corresponds to the particular device; (b) adding the node to a statistical device graph model that includes a plurality of additional nodes, each of which corresponds to one of the plurality of devices; and (c) establishing a link between the node and one of the additional nodes, wherein the linked nodes correspond to at least two devices that were observed to have provided a common login identifier to a particular data provider. In some cases each of the consumer interactions includes a consumer using one of the plurality of devices to provide a login identifier associated with the consumer to one of the plurality of data providers. In some cases the device type determination process further includes (a) defining a node that corresponds to the particular device; and (b) associating the reevaluated Device-Type parameter with the node. In some cases the device type determination process further includes recording, in a data structure stored in a memory device, metadata characterizing (a) a node that corresponds to the particular device, and (b) the reevaluated Device-Type parameter.

Another example embodiment provides a device modeling system that includes a memory device and a processor that is operatively coupled to the memory device. The processor is configured to execute instructions stored in the memory device that, when executed, cause the processor to carry out a device modeling process. The device modeling process includes receiving observational data from a plurality of data providers. The observational data characterizes a plurality of consumer interactions with the data providers. Each of the consumer interactions is characterized by a device identifier and a login identifier, the device identifier being associated with a device that is used to provide the login identifier to one of the data providers. The device modeling process further includes defining a plurality of nodes, each of which corresponds to a device that is associated with one or more of the plurality of consumer interactions characterized by the observational data. The device modeling process further includes setting a Device-Type parameter for a particular one of the plurality of nodes. The Device-Type parameter characterizes the device corresponding to the particular node as Private, Shared, or Public. The Device-Type parameter is set based on consumer interactions with more than one of the plurality of data providers form which the observational data is received. In some cases the device modeling process further includes (a) establishing a link between at least two of the plurality of nodes, wherein the at least two linked nodes correspond to at least two devices that were observed to have provided a login identifier that is common to a single data provider; and (b) recording, in a data structure stored in a memory device, metadata characterizing the plurality of nodes and the established link. In some cases at least one of the consumer interactions includes providing the login identifier to access an online resource provided by one of the data providers. In some cases the Device-Type parameter is set to Private in response to receiving observational data indicating that multiple data providers have observed the device providing only one login identifier.

The foregoing description has been presented for the purposes of illustration and description. It is not intended to be exhaustive or to limit the disclosure to the particular described embodiments. Therefore many modifications and variations are possible in light of this disclosure. Thus it is intended that the scope of the invention be limited not by this detailed description, but rather by the claims appended hereto.

What is claimed is:

1. A non-transitory computer readable medium having instructions encoded thereon that, when executed by one or more processors, cause a device type determination process to be carried out, the process comprising:
   receiving, at an analytics server having one or more processors and a memory resource, observational data from a plurality of data providers, wherein:
      the observational data characterizes a plurality of consumer authentication interactions between a plurality of consumers and the plurality of data providers,
      each of the consumer authentication interactions is characterized by a device identifier, a digital certificate, and a login identifier that are provided from one of the consumers to one of the data providers so that the consumer may access a resource provided by the data provider, the device identifier being associated with a corresponding device that the consumer uses to provide the login identifier to the data provider,
      the observational data includes a plurality of device identifiers that are associated with a corresponding plurality of devices, each of the plurality of devices being associated with one or more of the plurality of consumer authentication interactions, and
      the observational data includes browser cookie data transmitted from a particular one of the devices to a particular one of the data providers during a particular one of the consumer authentication interactions;
   reading, by a data provider interface software module executable on the one or more processors of the analytics server, the browser cookie data that is included in the observational data received by the analytics server to determine a particular device identifier for the particular device that transmitted the browser cookie data;
   generating, by a device modeling software module executable on the one or more processors of the analytics server, a distribution of login identifiers observed as having been provided by the plurality of devices associated with the plurality of device identifiers included in the received observational data;
   determining, by the device modeling software module, a first quantity of unique login identifiers observed by a first data provider as having been provided by the particular device, wherein the first quantity is extracted from the generated distribution of login identifiers, and wherein the first data provider is one of the plurality of data providers from which the observational data is received;

setting, by the device modeling software module, a Device-Type parameter for the particular device based on the first quantity;

determining, by the device modeling software module, a second quantity of unique login identifiers observed by a second data provider as having been provided by the particular device, wherein the second quantity is extracted from the generated distribution of login identifiers, and wherein the second data provider is one of the plurality of data providers from which the observational data is received;

reevaluating, by the device modeling software module, the Device-Type parameter based on the second quantity; and recording, in a data structure stored in the memory resource of the analytics server, metadata characterizing the reevaluated Device-Type parameter for the particular device.

2. The non-transitory computer readable medium of claim 1, wherein the Device-Type parameter is selected from a group consisting of Private, Shared, and Public.

3. The non-transitory computer readable medium of claim 1, wherein:

the observational data further includes timestamp data associated with certain of the consumer authentication interactions; and determining the first quantity of unique login identifiers comprises evaluating consumer authentication interactions that occurred within a defined timeframe.

4. The non-transitory computer readable medium of claim 1, wherein setting the Device-Type parameter comprises setting the Device-Type parameter to Private when the first quantity is one.

5. The non-transitory computer readable medium of claim 1, wherein reevaluating the Device-Type parameter comprises changing the Device-Type parameter from Private to Shared or Public when the first quantity is one and the second quantity is greater than one.

6. The non-transitory computer readable medium of claim 1, wherein the device type determination process further comprises:

defining a node that corresponds to the particular device;

adding the node to a statistical device graph model that comprises a plurality of additional nodes, each of which corresponds to one of the plurality of devices; and displaying the statistical device graph model.

7. The non-transitory computer readable medium of claim 1, wherein the device type determination process further comprises:

defining a node that corresponds to the particular device;

adding the node to a statistical device graph model that comprises a plurality of additional nodes, a particular one of which corresponds to an additional one of the plurality of devices; and establishing a link between the particular device and the additional device in response to determining that the particular device and the additional device both provided a common login identifier to the first data provider.

8. The non-transitory computer readable medium of claim 1, wherein certain of the consumer authentication interactions are further characterized by a timestamp corresponding to a time at which one of the consumers accessed the resource provided by one of the data providers.

9. The non-transitory computer readable medium of claim 1, wherein the device type determination process further comprises:

defining a node that corresponds to the particular device; and associating the reevaluated Device-Type parameter with the node.

10. The non-transitory computer readable medium of claim 1, wherein the device type determination process further comprises recording, in the data structure, metadata characterizing a node that corresponds to the particular device.

11. A computer-implemented cross-device consumer identification method comprising:

receiving, at an analytics server having one or more processors and a memory resource, observational data from a plurality of data providers, wherein:

the observational data characterizes a plurality of consumer authentication interactions between a plurality of consumers and the plurality of data providers, each of the consumer authentication interactions is characterized by a device identifier, a digital certificate, and a login identifier that are provided from one of the consumers to one of the data providers so that the consumer may access a resource provided by the data provider, the device identifier being associated with a corresponding device that the consumer uses to provide the login identifier to the data provider, the observational data includes a plurality of device identifiers that are associated with a corresponding plurality of devices, each of the plurality of devices being associated with one or more of the plurality of consumer authentication interactions, and the observational data includes browser cookie data transmitted from a first one of the devices to a first one of the data providers during a particular one of the consumer authentication interactions;

reading, by a data provider interface software module executable on the one or more processors of the analytics server, the browser cookie data that is included in the observational data received by the analytics server to determine a first device identifier for the first device that transmitted the browser cookie data;

generating, by a device modeling software module executable on the one or more processors of the analytics server, a distribution of login identifiers observed as having been provided by the plurality of devices associated with the plurality of device identifiers included in the received observational data;

defining, by the device modeling software module, a first node which corresponds to the first device and defining a second node which corresponds to a second one of the devices, wherein the first and second devices are each associated with one or more of the plurality of consumer authentication interactions characterized by the observational data;

determining, by the device modeling software module, a first quantity of unique login identifiers observed by the first data provider as having been provided by the first device, wherein the first quantity of unique login identifiers is extracted from the generated distribution of login identifiers;

setting, by the device modeling software module, a Device-Type parameter for the first node, wherein the Device-Type parameter characterizes the first device as Private, Shared, or Public, and wherein the Device-Type parameter is set based on the first quantity of unique login identifiers;

establishing, by the device modeling software module, a link between the first and second devices in response to determining that the first and second devices provided a common login identifier to the first data provider; and recording, in a data structure stored in the memory resource of the analytics server, metadata characterizing the first and second nodes and the established link.

12. The computer-implemented cross-device consumer identification method of claim 11, further comprising:

determining, by the device modeling software module, a second quantity of unique login identifiers observed by a second data provider as having been provided by the first device; and reevaluating, by the device modeling software module, the Device-Type parameter based on the second quantity.

13. The computer-implemented cross-device consumer identification method of claim 11, wherein the link is associated with an edge weight that corresponds to a quantity of data providers that observed the first and second devices providing the common login identifier to the first data provider.

14. The computer-implemented cross-device consumer identification method of claim 11, further comprising displaying a statistical device graph model comprising the first and second nodes and an edge connecting the first and second nodes.

15. A device modeling system that comprises a memory device and a processor that is operatively coupled to the memory device, wherein the processor is configured to execute instructions stored in the memory device that, when executed cause the processor to carry out a device modeling process that comprises:

receiving, by the device modeling system, observational data from a plurality of data providers, wherein:

the observational data characterizes a plurality of consumer authentication interactions between a plurality of consumers and the plurality of data providers, each of the consumer authentication interactions is characterized by a device identifier, a digital certificate, and a login identifier that are provided from one of the consumers to one of the data providers so that the consumer may access a resource provided by the data provider, the device identifier being associated with a corresponding device that the consumer uses to provide the login identifier to the data provider, and the observational data includes a plurality of device identifiers that are associated with a corresponding plurality of devices, each of the plurality of devices being associated with one or more of the plurality of consumer authentication interactions;

generating, by a device modeling software module executable on the processor, a distribution of login identifiers observed as having been provided by the plurality of devices associated with the plurality of device identifiers included in the observational data received by the device modeling;

determining, by the device modeling software module, a first quantity of unique login identifiers observed by a first data provider as having been provided by the first device, wherein the first quantity is extracted from the generated distribution of login identifiers;

defining a first node that corresponds to the first device;

setting, by the device modeling software module, a Device-Type parameter for the first node based on the first quantity; and recording, in a data structure stored in the memory device, metadata characterizing , the Device-Type parameter for the first device.

16. The device modeling system of claim 15, wherein the device modeling process further comprises:

defining a second node that corresponds to a second device;

establishing a link between the first and second devices in response to determining that the first and second devices provided a common login identifier to the first data provider; and recording, in the data structure stored in the memory device, metadata characterizing the established link.

17. The device modeling system of claim 15, wherein a particular consumer authentication interaction is characterized by a timestamp corresponding to a time at which a particular consumer accessed a particular resource provided by the first data provider.

18. The device modeling system of claim 15, wherein the Device-Type parameter is set to Private in response to receiving observational data indicating that multiple data providers have observed the first device providing only one unique login identifier.

19. The device modeling system of claim 15, wherein the Device-Type parameter characterizes the first device as Private, Shared, or Public.

20. The device modeling system of claim 15, wherein the Device-Type parameter is set based on consumer authentication interactions with more than one of the plurality of data providers from which the observational data is received.

* * * * *